United States Patent [19]

Bartel et al.

[11] Patent Number: 4,940,943

[45] Date of Patent: Jul. 10, 1990

[54] METHOD AND APPARATUS FOR OPTIMIZING THE RECEPTION PATTERN OF THE ANTENNA OF A PROPAGATING ELECTROMAGNETIC WAVE LOGGING TOOL

[75] Inventors: Roger P. Bartel; Paul F. Rodney, both of Houston, Harris County, Tex.

[73] Assignee: Baroid Technology, Inc., Houston, Tex.

[21] Appl. No.: 183,695

[22] Filed: Apr. 19, 1988

[51] Int. Cl.$^5$ ............................................. G01V 3/30
[52] U.S. Cl. ........................................................ 324/338
[58] Field of Search .................................. 324/338–343, 324/356, 369

[56] References Cited

U.S. PATENT DOCUMENTS

| | | | |
|---|---|---|---|
| 4,553,097 | 11/1985 | Clark | 324/338 |
| 4,651,101 | 3/1987 | Barber et al. | 324/339 |
| 4,785,247 | 11/1988 | Meador et al. | 324/338 |

FOREIGN PATENT DOCUMENTS 2156527 10/1985 United Kingdom ................ 324/369

Primary Examiner—Gerard R. Strecker
Assistant Examiner—Walter E. Snow
Attorney, Agent, or Firm—Browning, Bushman, Anderson & Brookhart

[57] ABSTRACT

A conventional electromagnetic logging device, having both MWD and wire line embodiments, and having a pair of cutouts spaced along the length of the tool mandrel, each cutout having a length of greater than 4.0 inches as measured along the longitudinal axis of the tool, is modified by adding a pair of full metal jackets around the pair of cutouts. The first metal jacket placed around the first cutout in the mandrel has an additional cutout therein having a length in the range of 1.0 to 4.0 inches and a depth in the range of 0.25 to 1.0 inch. A transmitting antenna is placed in the cutout in the first metal jacket. The second metal jacket placed around the second cutout of the tool mandrel has a pair of spaced cutouts therein, each having a length in the range of 1.0 to 4.0 inches and a depth in the range of 0.25 to 1.0 inch. First and second electromagnetic receiving antennas are placed in the first and second cutouts in the second metal jacket, respectively. In alternative embodiments, the walls of the cutouts in the full metal jackets are either parallel, diverging, converging or stair stepped. In further embodiments, the cutouts having lengths of 1.0 to 4.0 inches and depths of 0.25 to 1.0 inches are formed directly in the mandrel instead of using the metal jackets.

38 Claims, 13 Drawing Sheets

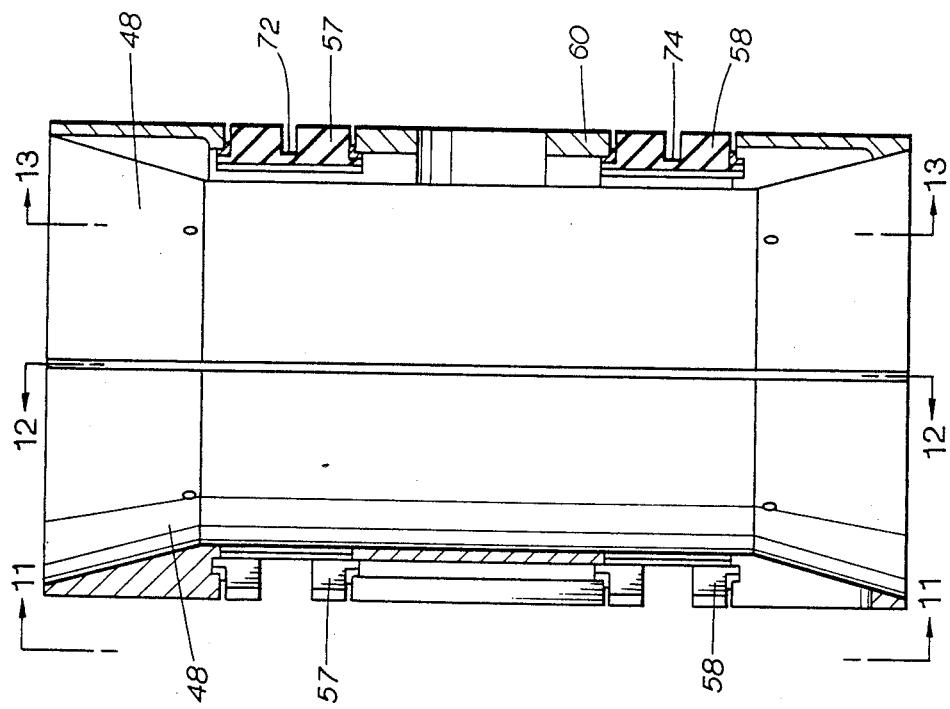
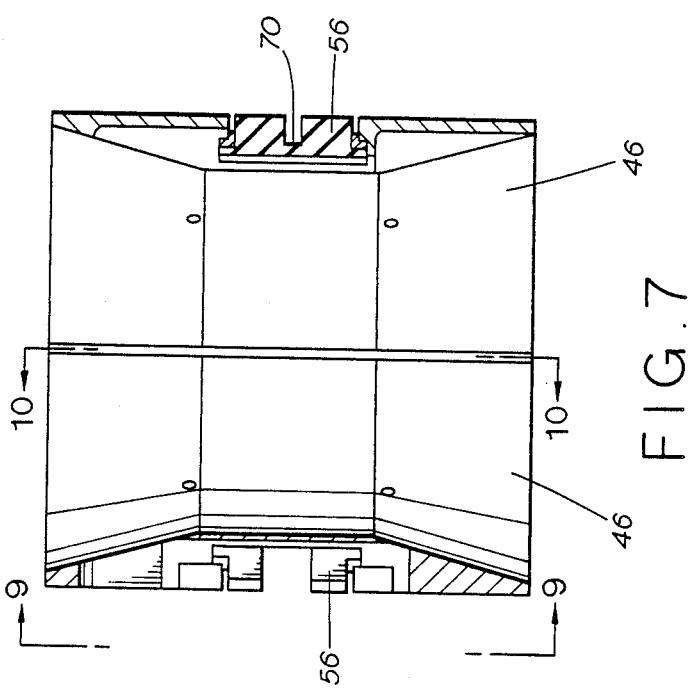
FIG. 8
FIG. 7

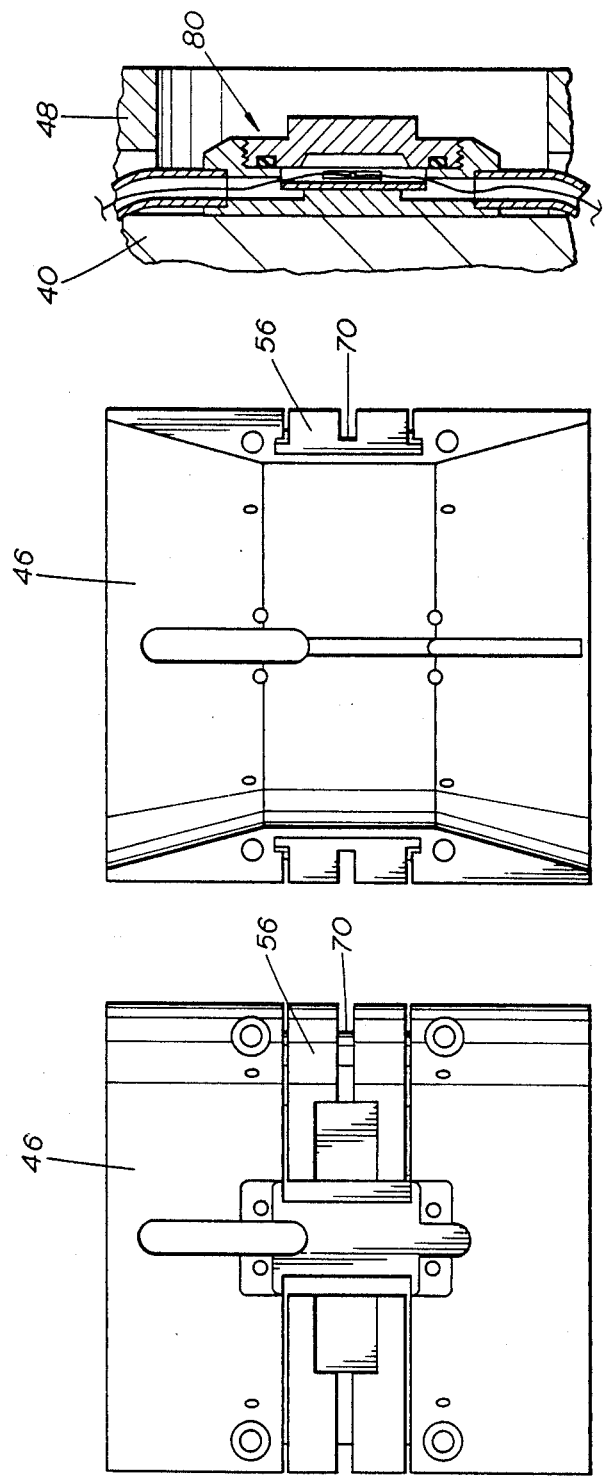

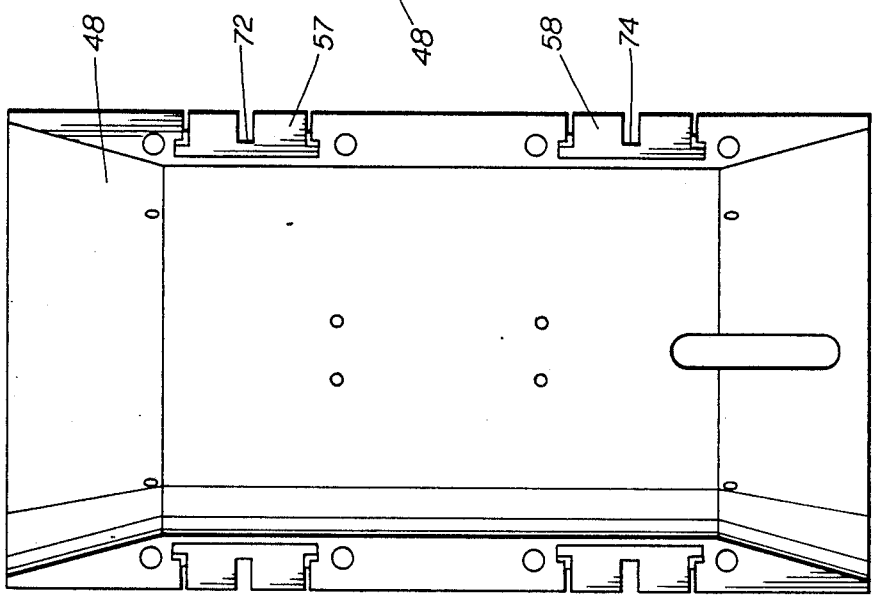
FIG. 13
FIG. 12
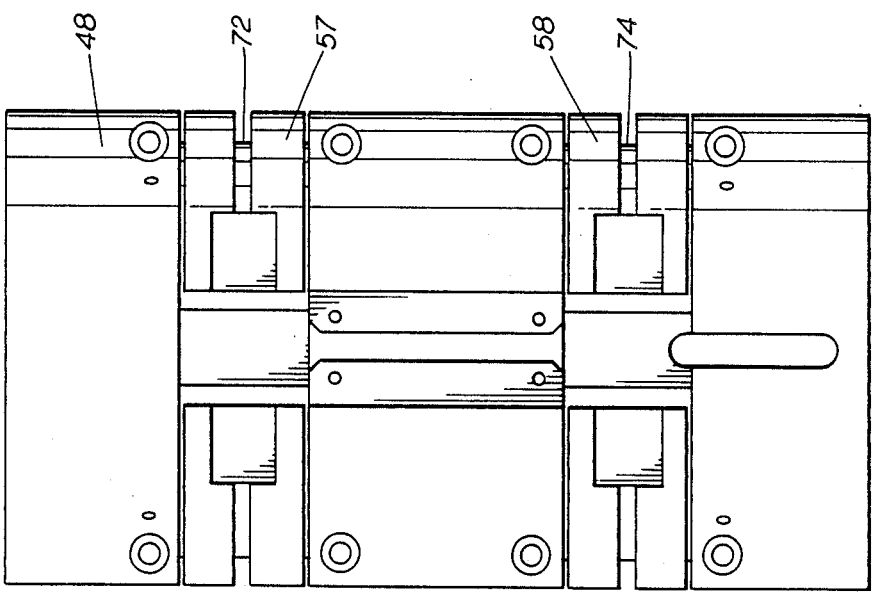
FIG. 11

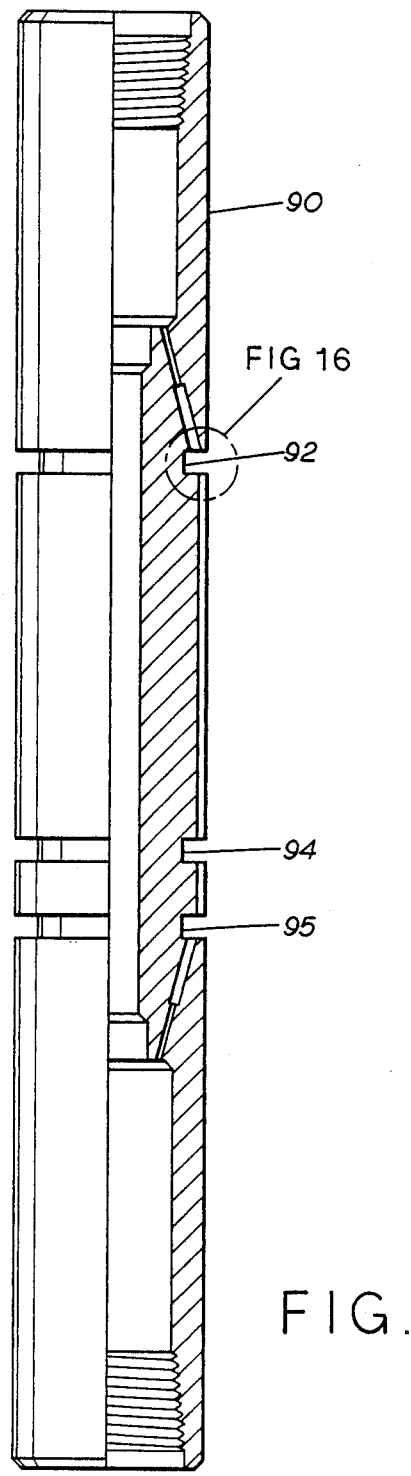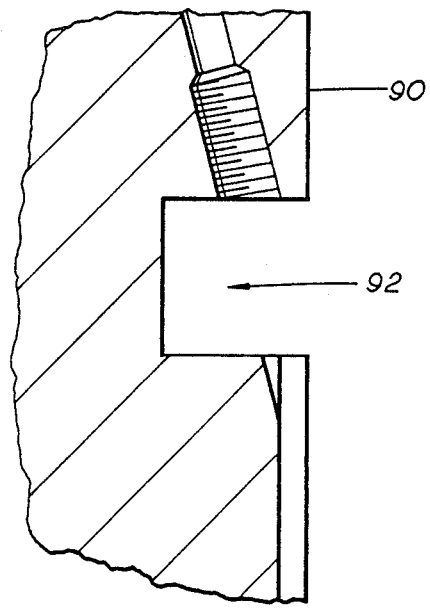
FIG. 15
FIG. 16

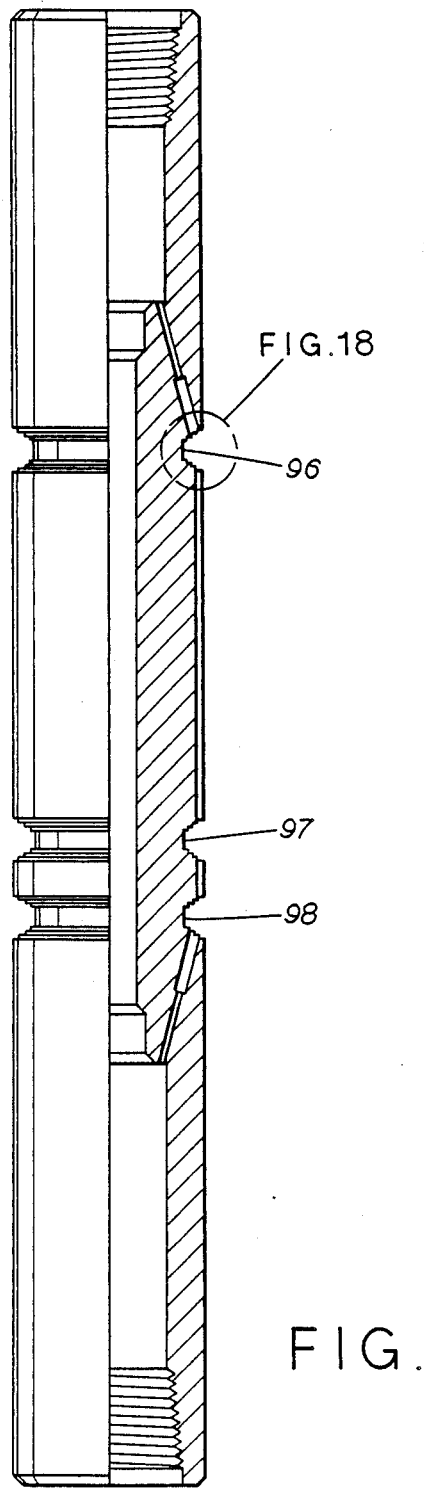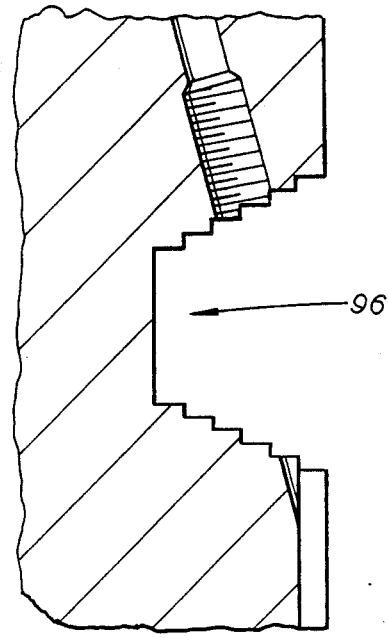
FIG. 18
FIG. 17

METHOD AND APPARATUS FOR OPTIMIZING THE RECEPTION PATTERN OF THE ANTENNA OF A PROPAGATING ELECTROMAGNETIC WAVE LOGGING TOOL

BACKGROUND OF THE INVENTION

1. Field of the Invention

The present invention relates generally to a method and apparatus for measuring formation parameters by transmitting and receiving electromagnetic signals by means disposed in recesses of a tubular housing member. More particularly, the present invention is related to downhole logging tools which use propagating electromagnetic waves to perform measurements of formation or borehole parameters.

2. Description of the Background

It is desirable for many reasons to transmit electrical signals through the Earth as a propagating medium, and to receive the signals at a location spaced from the transmitter. Such a signal propagation system is, for example, used both for the determination of various parameters associated with the propagating medium and for communication purposes. These systems are often used in the investigation of the environment surrounding a borehole, and in particular, the surrounding formations. Various types of borehole logging systems are available to perform these investigations. A class of these systems utilize electromagnetic field phenomena to obtain data from the environments surrounding the borehole. One type of prior art logging is electrode logging which utilizes an electric field in the surrounding formation to produce a measure of the conductivity of the formation. A conductive mud is necessary for proper use of this system, thus rendering the system inoperative with oil based muds. Inductive logging is another type of prior art electromagnetic logging which uses a time-varying magnetic field in the formation to produce a secondary current flow in the formation. The secondary current flow sets up a second magnetic field which induces current in receiving coils positioned in the borehole, the induced current in the receiving coil or coils being proportional to the secondary current flow in the formation and thus is directly proportional to the conductivity or inversely proportional to the resistivity of the surrounding formation. Electromagnetic wave propagation for investigating the environment around a borehole is the subject of the present invention.

An electromagnetic logging system of the wave propagation type is disclosed in Gouilloud et al., U.S. Pat. No. 3,551,797, which is incorporated herein by reference. This patent discloses a wire line system having a transmitter and receivers for measuring formation parameters, and utilizing phase comparison and amplitude. However, the Gouilloud wire line system is not particularly useful in a measuring while drilling (hereinafter, "MWD") configuration. The Gouilloud patent discloses a nonconductive sonde of insufficient strength to operate in a drill string characterized by massive steel and more particularly drill collars in the vicinity of the drill bit and measurement apparatus. U.S. Pat. Nos. 4,107,597 and 4,185,238 also show electromagnetic wave propagation systems for use in wire line apparatus. U.S. Pat. No. 4,107,597, for example, describes the wire line sonde as being constructed of a non-conductive material which is customary in such devices in order to accommodate the use of electromagnetic transmitting and receiving apparatus.

U.S. Pat. No. 3,079,550 shows an induction logging system for measuring similar formation parameters, utilizing lower frequencies and requiring a conductive mud in the borehole.

An improvement over each of the above-referenced electromagnetic logging systems is described in U.S. patent application Ser. No. 036,170, filed on Apr. 6, 1987 and assigned to the Assignee of the present application, now U.S. Pat. No. 4,875,247. This present application is an improvement over the methods and apparatus described in the said application No. 036,170.

One of the major problems associated with downhole logging tools, whether they be wireline or MWD, is that of overcoming borehole effects. Another failure mode associated with electromagnetic wave propagation is that of damage to the antennas.

The primary object of the present invention is to provide a new and improved electromagnetic wave propagation tool which has a greatly enhanced immunity to borehole effects.

It is yet another object of the invention to reduce the susceptibility of the electromagnetic wave propagating antennas to damage while operating downhole.

SUMMARY OF THE INVENTION

The objects of the invention, are accomplished, generally, by methods and apparatus which utilize electromagnetic transmitting and receiving antennas in cutouts having lengths in the range of 1.0 to 4.0 inches, as measured along the longitudinal axis of the housing, and depths in the range of 25 to 1.0 inches. In one embodiment of the invention, the cutouts are formed directly in the tool mandrel. In another embodiment of the invention, the cutouts are formed in full metal jackets which are attached to the tool mandrel along its length.

As additional features of the invention, the cutouts have either parallel walls, converging walls, diverging walls or stair step walls.

As yet another feature of the invention, a method is disclosed for calculating the dimensions of the cutouts based upon the range of drilling mud and formation resistivities to be encountered in measuring the formation parameters.

In still another feature, the near field electromagnetic response is optimized while minimizing the mechanical stress involved with using electromagnetic antennas in cutouts spaced along the length of the tool mandrel.

BRIEF DESCRIPTION OF THE DRAWINGS

FIG. 7 is an elevated view, partly in cross-section, of the transmitter full metal jacket in accordance with the present invention;

FIG. 8 is an elevated view, partly in cross-section, of the receiver full metal jacket in accordance with the invention;

FIG. 9 is an elevated view of the transmitter full metal jacket, taken along the lines 9—9 of FIG. 7;

FIG. 10 is an elevated view of the transmitter full metal jacket, taken along the lines 10—10 of FIG. 7;

FIG. 11 is an elevated view of the receiver full metal jacket, taken along the lines 11—11 of FIG. 8;

FIG. 12 is an elevated view of the receiver full metal jacket, taken along the lines 12—12 of FIG. 8;

FIG. 13 is an elevated view of the receiver full metal jacket, taken along the lines 13—13 of FIG. 8;

FIG. 14 is an elevated, enlarged view, partly in cross-section, of an electrical feedthrough illustrated in FIG. 4;

FIG. 15 is an elevated view, partly in cross-section, of an MWD tool having the transmitter and receiver cutouts according the invention formed as integral parts of the mandrel;

FIG. 16 is an enlarged view, partly in cross-section, of one of the cutouts shown in FIG. 15;

FIG. 17 is an elevated view, partly in cross-section, of an MWD tool having the transmitter and receiver cutouts formed in an alternative embodiment of the invention;

FIG. 18 is an enlarged view, partly in cross-section, of one of the cutouts shown in FIG. 17;

DETAILED DESCRIPTION OF THE INVENTION

Figure 1:
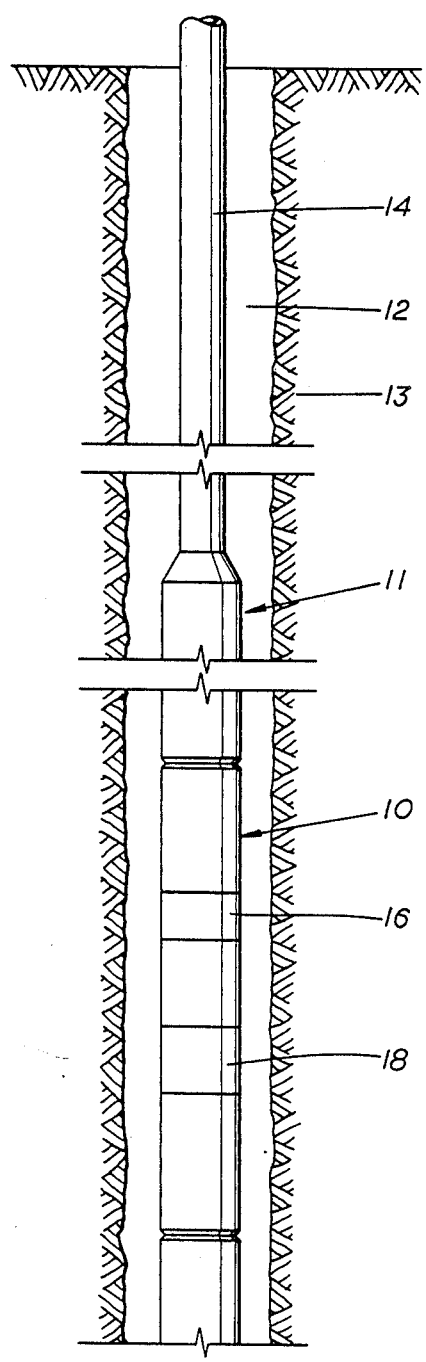
FIG. 1 is an elevated view of a prior art MWD tool suspended in an earth borehole as part of a drill string.
Figure 2:
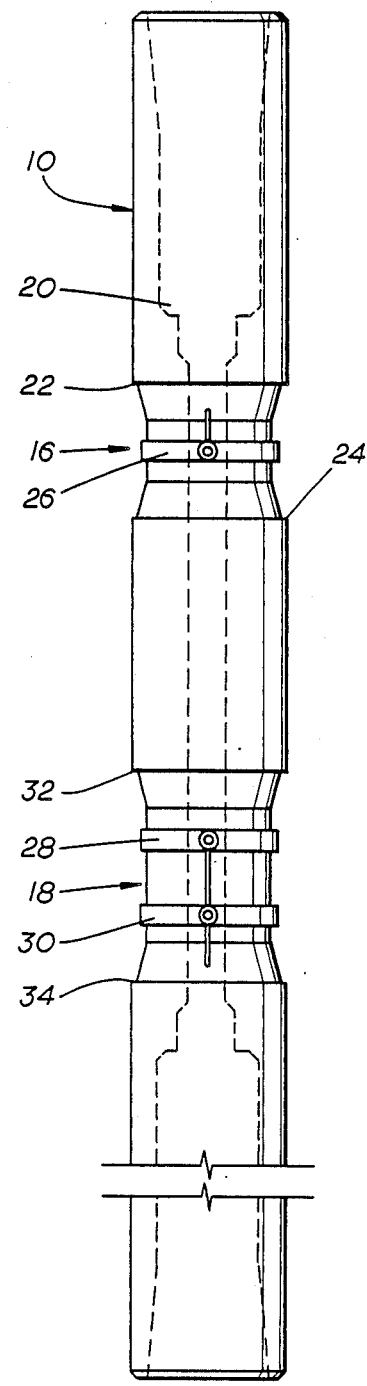
FIG. 2 is an elevated view of the MWD tool illustrated in FIG. 1, prior to having non-conductive covers placed over the transmitting and receiving sections.

FIGS. 1 and 2 illustrate the system of the prior art as characterized in the aforementioned U.S. patent application Ser. No. 036,170, now U.S. Pat. No. 4,785,247. A logging tool 10 is suspended in an earth borehole 12 on a string of drill pipe 14 from the earth's surface, which includes one or more drill collars 11, with the borehole 12 passing through the earth formation 13. A transmitter section 16 and a dual receiver section 18 are included within the logging tool 10. The sections 16 and 18 are covered over with a non-conductive material as illustrated in FIG. 1. FIG. 2 shows the tool 10 in its early manufacturing stage before the non-conductive material is applied to the transmitter section 16 and receiving section 18. It should be appreciated that the body 20 of the tool 10 is usually made of steel. Between the points 22 and 24 the body of the tool 20 has a reduced diameter portion having a fairly large effective radius concave surface. The antenna coil 26 is mounted on or near the mid point between the points 22 and 24.

In a similar way, the receiver section 18 has two receiver coil antennas 28 and 30 mounted on the interior of a reduced diameter portion between the points 32 and 34 on the body 20. It should be appreciated that the embodiment illustrated in FIG. 2 corresponds with the apparatus illustrated in FIGS. 2a and 2b in the aforementioned U.S. patent application Ser. No. 036,170 and that the apparatus of FIGS. 1 and 2 is shown merely to illustrate the large effective radius curved surface, sloping in from the outer perimeter of the tool body, as is exemplary of the prior art, for both the transmitter and the receiving sections.

Figure 19:
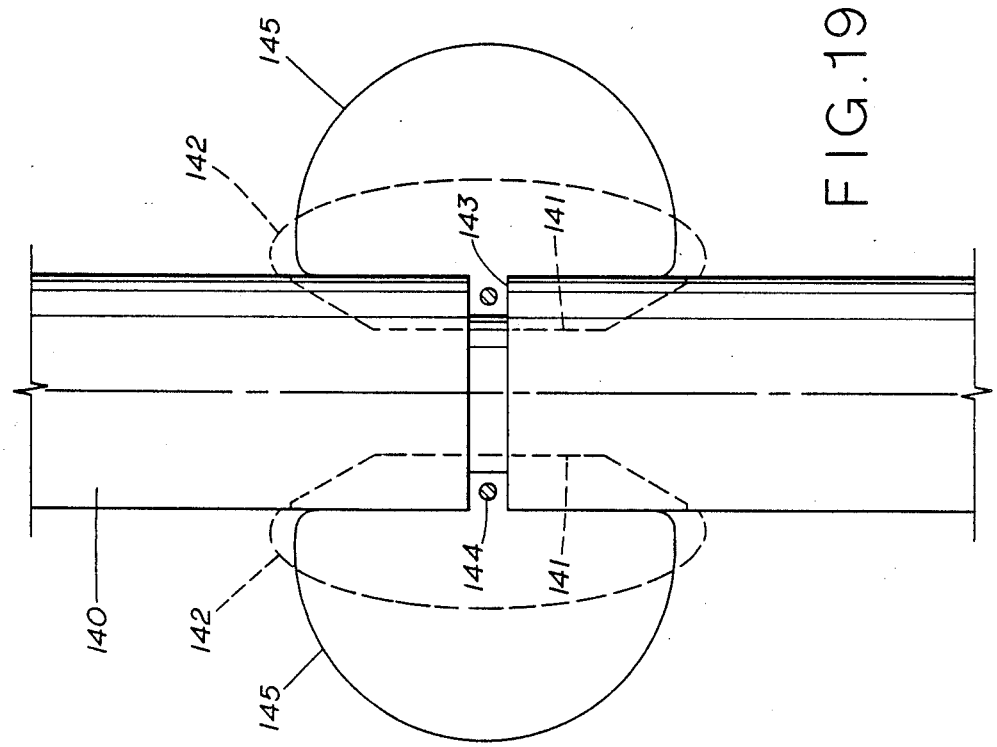
FIG. 19 is a schematic comparison of the near field wave reception patterns of full metal jacket sensors according to the invention and conventional sensors.

FIG. 19 illustrates schematically a comparison of the near field reception patterns of the methods and apparatus used in accordance with the present invention and that of the conventional apparatus illustrated in FIGS. 1 and 2. In the conventional wave pattern, the tool body 140 is illustrated as having the conventional cutout portion, shown by the dotted line 141, which in turn has a near field reception pattern illustrated by the dotted line 142. In accordance with the system according to the present invention, the antenna is placed within a very narrow cutout 143 around the antenna 144. It should be appreciated, for the sake of comparison, that the antenna 144 is commonly placed with respect to both the cutout 141 and the cutout 143. When using the cutout 143, there is produced a near field reception pattern 145. Thus, it should be appreciated that there is a greatly enhanced near field reception pattern when using the cutout 143 around the antenna 144.

In attempting to explain the theory of operation of the methods and apparatus described herein, it should be appreciated that when we use the expression "full metal jacket", we are referring to the snap-on assemblies illustrated in FIGS. 4-13, which include the reduced length cutouts. However, the theory will be the same for the case of the narrow cutouts being integral with the tool body. The following will hopefully provide an insight into the basic physics involved in using the full metal jacket antenna system.

Rather than beginning with a discussion of electromagnetic waves, we will first consider analogous phenomena with fluid waves. Let us suppose that an immovable barrier spans a very large and deep body of water, and extends above the surface of the water down to the bottom of the medium containing the water. Plane waves are impingent upon the barrier from the left. However, since the barrier is rigid and extends to the bottom of the container, no waves are transmitted to the right of the barrier.

If, however, we modify the barrier, and either allow it to move with the waves, or allow the waves to spill over or under the barrier, plane waves will be transmitted to the right.

Another possible way of modifying the barrier is to cut a slit in it. If the barrier is immovable, circular waves will be diffracted from the slit.

Finally, if the barrier contains a slit and is also allowed to move with the waves, a more complex pattern of transmitted and diffracted waves results. The conditions which lead to the complex pattern are very similar to those which produce the radiation pattern of a propagating wave type of electromagnetic sensor.

We now turn our attention to a discussion of electromagnetic wave patterns. It can often be proven that the radiation pattern of an antenna (the intensity pattern it produces when it is transmitting) is equal to the receiving pattern of the incoming radiation. For purposes of this discussion, we will assume that this reciprocity relation is valid. This proof can be shown to be invalid in this case because the results of interest are in the near field of the receiving antenna, and because the tool body acts as a receiver. However, this approximation is valid enough to help provide an understanding of the operation of the full metal jacket antenna.

Generally, the waves that are of interest in a propagating wave electromagnetic sensor are not only propagating transverse to the sensor, but along the axis of the sensor. Therefore, phase considerations of the induced currents are important. In addition, at the surface of the sensor, the wave propagation direction is forced to be orthogonal to the sensor body due to the high conductivity of the sensor body. The wavelength of the radiation is generally much longer than the diameter of the body. Under such conditions, the portion of the wave which is propagating normal to the tool body is merely scattered around the body. However, by making a cutout in the tool for the receiving antenna, the cutout acts as a diffraction aperture, and thus broadens the radiation pattern. Thus, by controlling the parameters of the cutout, one can control the radiation (or receiving) pattern of an antenna located in the cutout. By "cutout", we intend to include not only the case of removing metal by the various known methods such as grinding, lathing, shaping, cutting and the like, but also to include any formed cavity without regard to how it is formed.

It appears, however, that when there is no cutout whatsoever, the radiation pattern limits to that of a simple dipole antenna. This is distinctly different from the situation described earlier with fluid waves. The reasons for this are not completely understood at this time, but they are born out by numerical analysis. Unquestionably, the fact that we are dealing with waves which travel both parallel to and orthogonal to the tool axis play a large part in producing this pattern. In addition, it must be noted that at the surface of the tool, where the waves propagate orthogonal to the tool, neither the amplitude nor the phase is constant along the tool: these surface waves are driven by the wave in the borehole. It therefore appears that by varying the notch diameter D2, and notch width T, as hereinafter described with respect to FIG. 21, it is possible to produce a radiation or receiving pattern as narrow as the dipole field of a single current loop.

Figure 3:
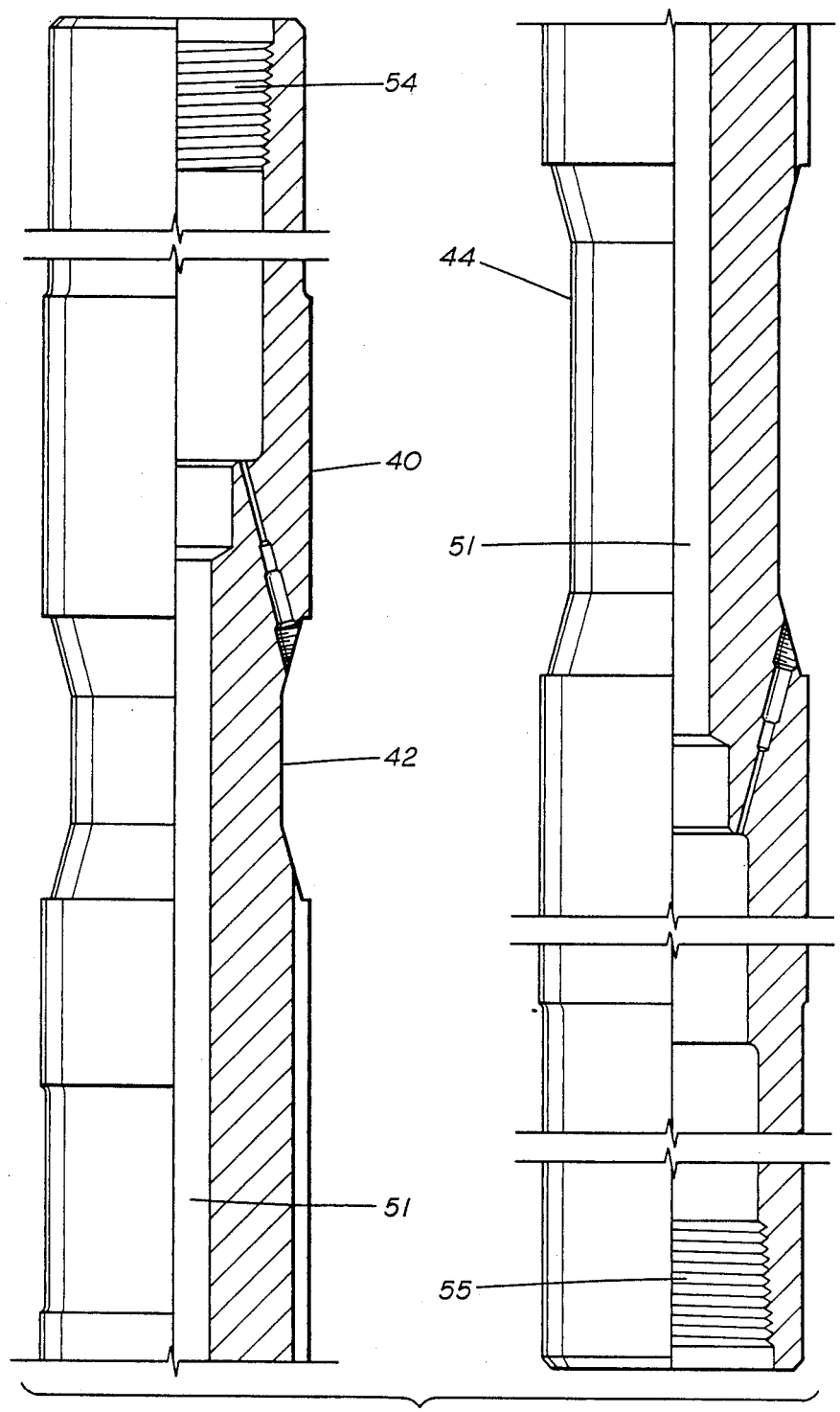
FIG. 3 is an elevated, segmented view, partly in cross-section, of a mandrel having a first section for mounting the transmitter and a second section for mounting the dual receivers.

Before commencing with the description of the tool illustrated in FIG. 3, it should be appreciated that the basic mandrel of the prior art tool 10 can be used to practice the present invention through the use of snap-on subassemblies described hereinafter in greater detail. Thus, in FIG. 3, the tubular, electrically conductive housing 40 corresponds essentially to the body 10 illustrated in FIG. 2, and has a first large effective radius cutout section 42 and a second large effective radius cutout section 44. As illustrated in FIG. 3, there are no receiving or transmitting antennas at this point in the manufacturing process.

Figure 4:
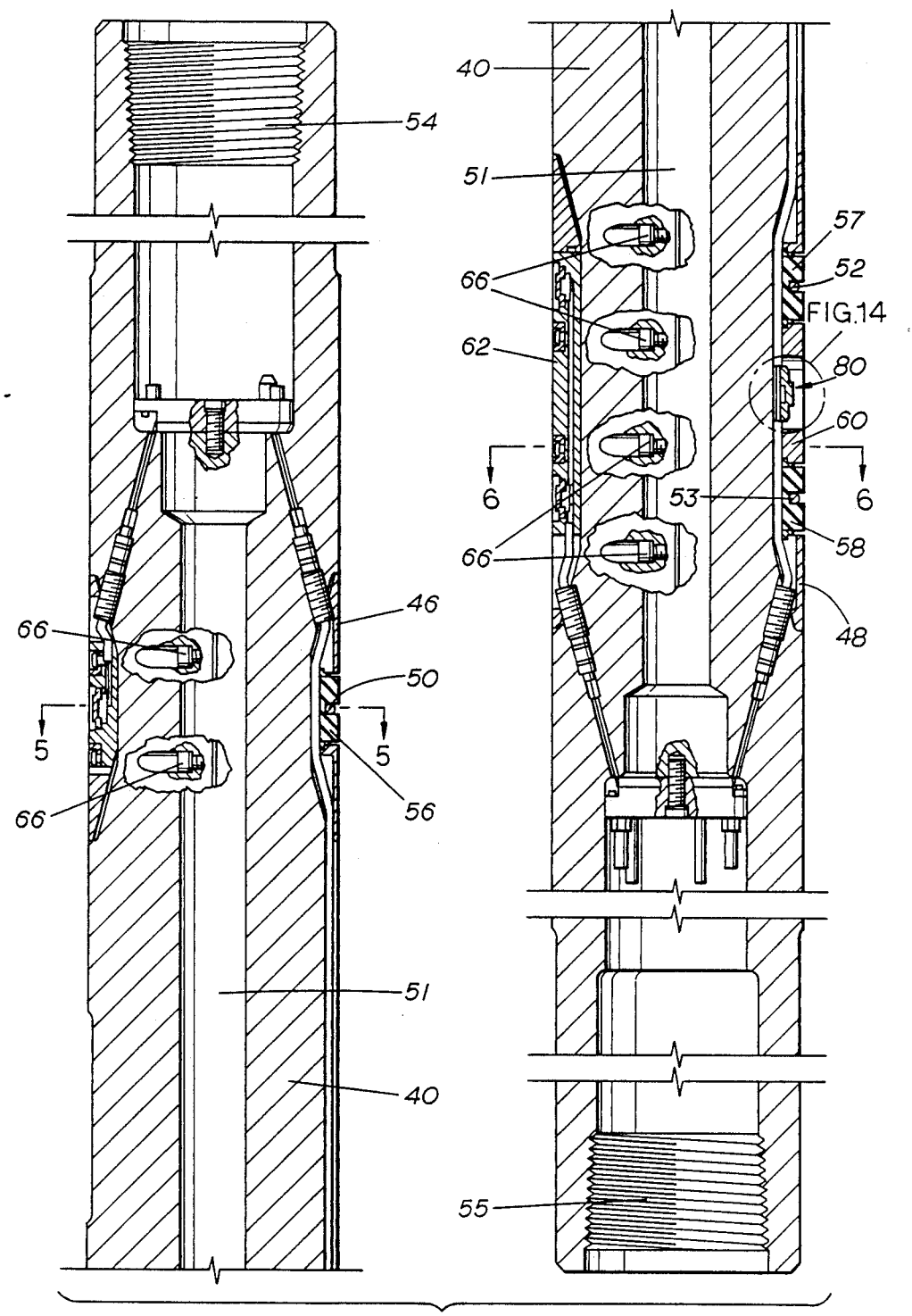
FIG. 4 is an elevated, segmented view, partly in cross-section, of the mandrel of FIG. 3 and having the transmitter and receivers mounted thereon in accordance with the present invention.

Referring now to FIG. 4, the subassemblies 46 and 48 are illustrated as snapped into place and thereafter bolted together on to the body 40. The snap-on assembly 46 has an electromagnetic wave propagating antenna 50 while the snapon apparatus 48 has a pair of receiving antennas 52 and 53. The body 40 is threaded at its ends 54 and 55 to allow threaded engagement in the drill string, above the drill bit (not illustrated). The antennas 50, 52 and 53 are electrically insulated from the conductive housing by the layers 56, 57 and 58, respectively, which are constructed of plastic or other non-conductors.

Figure 5:
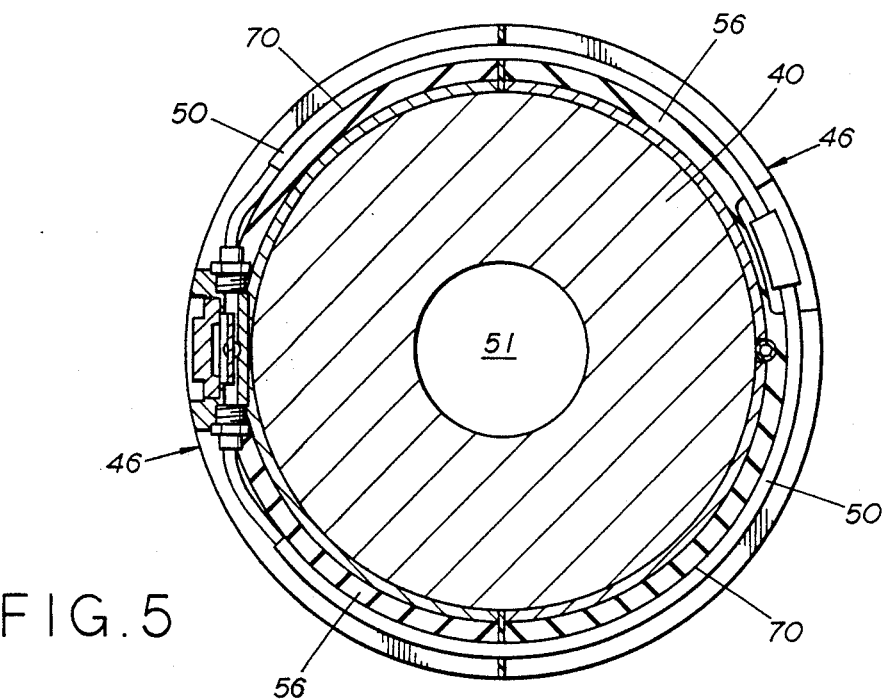
FIG. 5 is a cross-sectional view taken along the lines 5—5 of FIG. 4.

FIG. 5 is a cross-sectional view taken along the lines 5—5 of FIG. 4, and illustrates the transmitter loop antenna 50. The body 44 has a central bore 51 through which drilling fluid flows to allow the drill string to drill in the conventional manner while using the tool of this present invention in the drill string, during the drilling operation.

Figure 6:
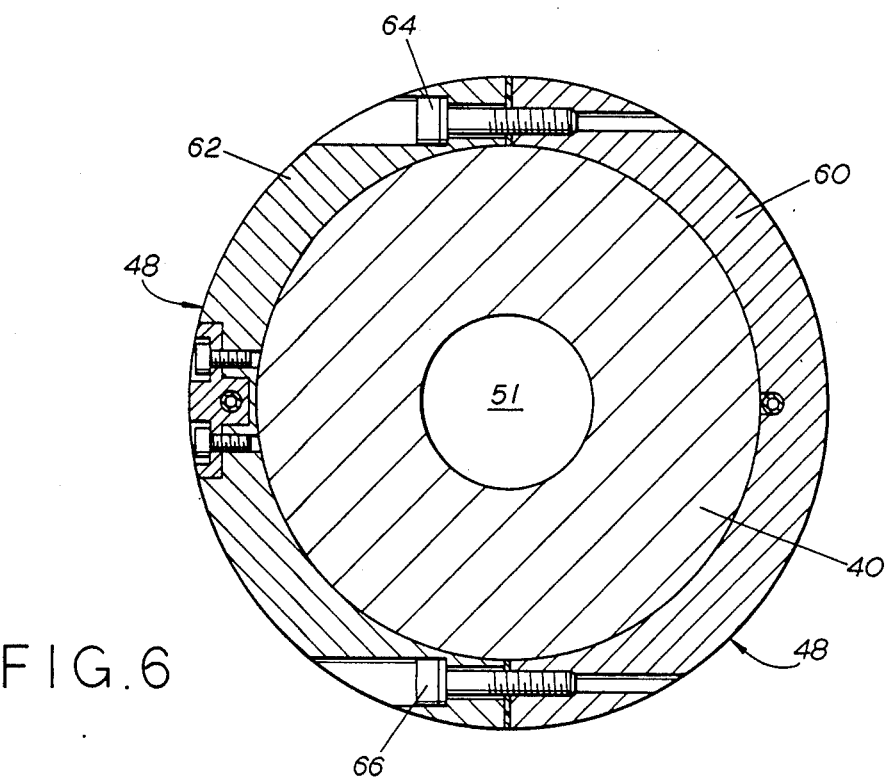
FIG. 6 is a cross-sectional view taken along the lines 6—6 of FIG. 4.

FIG. 6 is a cross-sectional view taken along the lines 6—6 of FIG. 4. The snap-on assembly 48 is actually comprised of two half circle sections 60 and 62 which snap together around the perimeter of the cutout section 44 illustrated in FIG. 3 and are then bolted together by the pair of bolts 64 and 66.

FIG. 7 is an elevated view of the subassembly 46 adapted to be clamped on to the body 44 and to house the antenna 50 (not illustrated) in the cutout 70. FIG. 9 is another view of the subassembly 46 taken along the lines 9—9 of FIG. 7. FIG. 10 is yet another view of the subassembly 46 taken along the lines 10—10 of FIG. 7.

FIG. 8 is an elevational view of the subassembly 48 which is adapted to snap onto and be bolted to the body 44 to house the receiving antennas 52 and 54 (not illustrated) in the cutout sections 72 and 74. FIG. 11 is an elevated view of the sub assembly 48 taken along the lines 11—11 of FIG. 8. FIG. 12 is another elevated view of the subassembly 48 taken along the lines 12—12 of FIG. 8. FIG. 13 is yet another elevated view of the subassembly 48 taken along the lines 13—13 of FIG. 8.

FIG. 14 is an enlarged view of the electrical connection feed-through 80 illustrated in less detail in FIG. 4.

As earlier discussed herein with respect to FIG. 19, by using the reduced cutout for the transmitting and receiving antennas, there is a greatly enhanced near field reception pattern. By using subassemblies 46 and 48 snapped on and bolted into the recessed areas 42 and 44 of FIG. 3, respectively, the tool thus has a reduced cutout section for the transmitting antenna 50 and the receiving antennas 52 and 54 as illustrated in FIG. 4. Thus, the invention contemplates the use of the prior art mandrel as illustrated in FIGS. 2 and 3 in conjunction with the snap on jackets 46 and 48 to create the enhanced near field reception pattern illustrated in FIG. 19. However, those skilled in the art will recognize that a tool can be constructed such that the reduced cutout for the antennas is an integral part of the tool.

For example, in FIG. 15, tool 90 has a first reduced cutout portion 92 (illustrated in greater detail in FIG. 16) for housing the transmitting antenna (not illustrated) and has two additional reduced cutout portions 94 and 95 for housing the two receiving antennas, not illustrated. Thus, it should be appreciated that a tool can be manufactured which either starts out with larger effective radius cutouts as practiced in the prior art and modified to create the reduced cutouts for enhanced near field reception patterns by using metal jackets or, alternatively, the reduced cutouts can be built right into the mandrel as illustrated in FIGS. 15 and 16.

FIGS. 17 and 18 illustrate an alternative embodiment of the invention wherein the reduced antenna cutouts can be fabricated in a stair step fashion to change the stress parameters on the tool if desired. Thus, as best illustrated in FIG. 18, the transmitting antenna cutout 96 has a succession of stairs to effect some of the mechanical stress which would otherwise be present, while at the same time providing a near field reception pattern which is substantially equivalent to that which uses no such steps, for example, as illustrated in FIGS. 15 and 16. The receiver cutouts 97 and 98 also use the steps to effect the mechanical stress. One of the advantages of using the metal jacket approach illustrated in FIG. 4, as contrasted with the integral embodiment of FIG. 15, is in having less mechanical stress.

Figure 20:
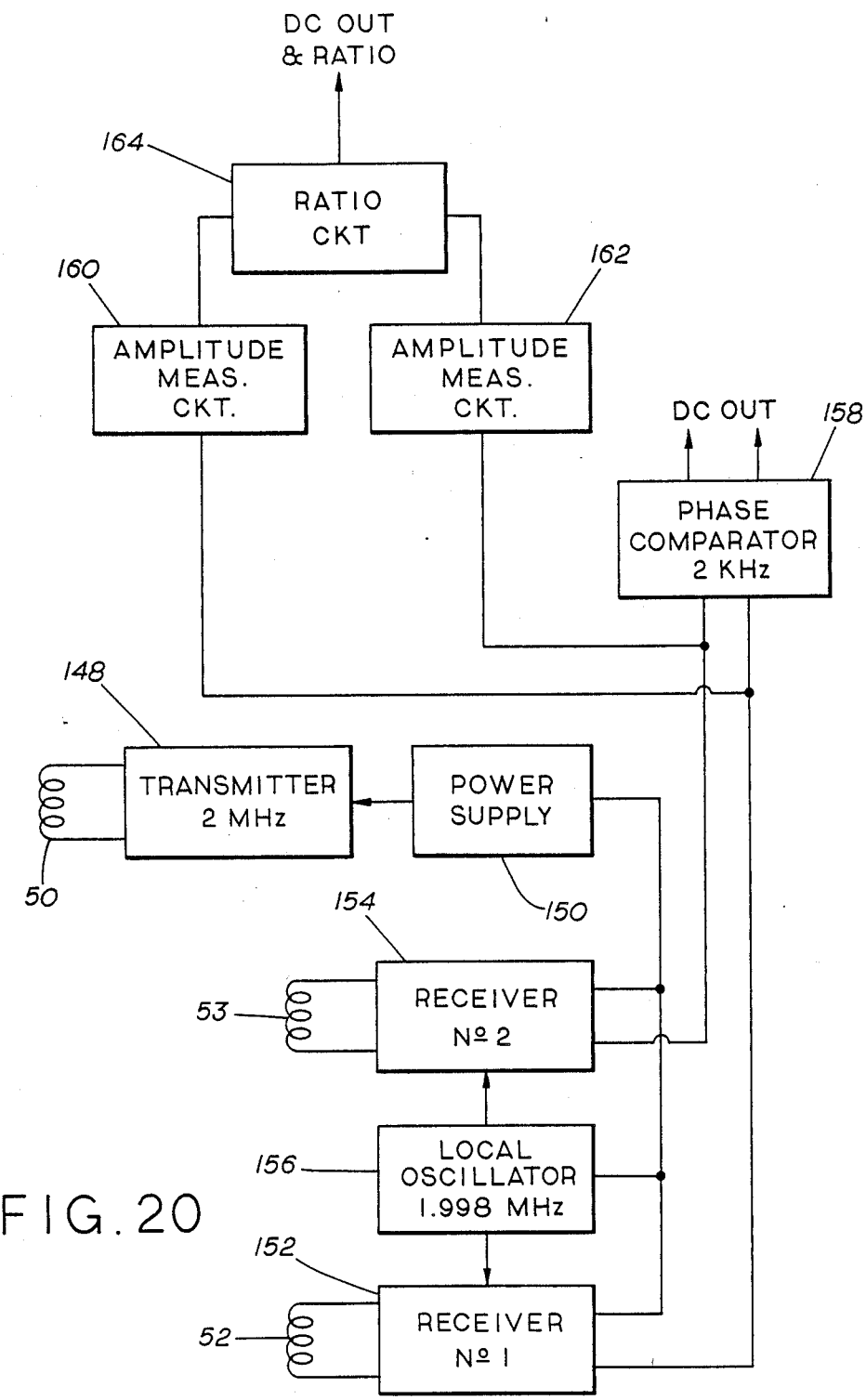
FIG. 20 is a block diagram of circuitry for use with the logging tools made in accordance with the invention.

Referring now to FIG. 20 of the drawings, a schematic circuit diagram is illustrated for providing a system to make formation resistivity measurements using the apparatus heretofore described. The circuitry can be placed in a drill collar 11 illustrated in FIG. 1, or can be located in the logging tool 40 of FIG. 3. The output of the circuit shown in FIG. 20 may be recorded in the electronics section or may be fed by a telemetry system (not illustrated) to the surface for concurrent processing and readout at the surface. In any event, the transmitter 148 is operated by power supply 150 at a frequency preferably in the range of 500 KHz to 10 MHz to provide an electromagnetic wave output from the transmitter antenna coil 50. This wave is propagated through the environment, including earth formations 13 surrounding the borehole, to receiver antenna coils 52 and 54 of the receivers 152 and 154, respectively, located at spaced longitudinal distances on the tool. The receiver antenna coils are coupled to the respective electronic receiver components which are driven by local oscillator 156 operating at a frequency within several KHz of the transmitted frequency to generate lower frequency output signals which are more easily handled, using the super hetrodyne NL technique. For example, transmitter 148 is illustrated as operating at 2 MHz and oscillator 156 is operating at 1.998 MHz. The outputs from receivers 152 and 154 are then fed to a phase comparator 158 and/or amplitude measuring circuits 160 and 162 which are in turn coupled to a ratio circuit 164 to measure signal phase shift and attenuation, all in accordance with the teaching of the aforementioned prior art patents.

Figure 21:
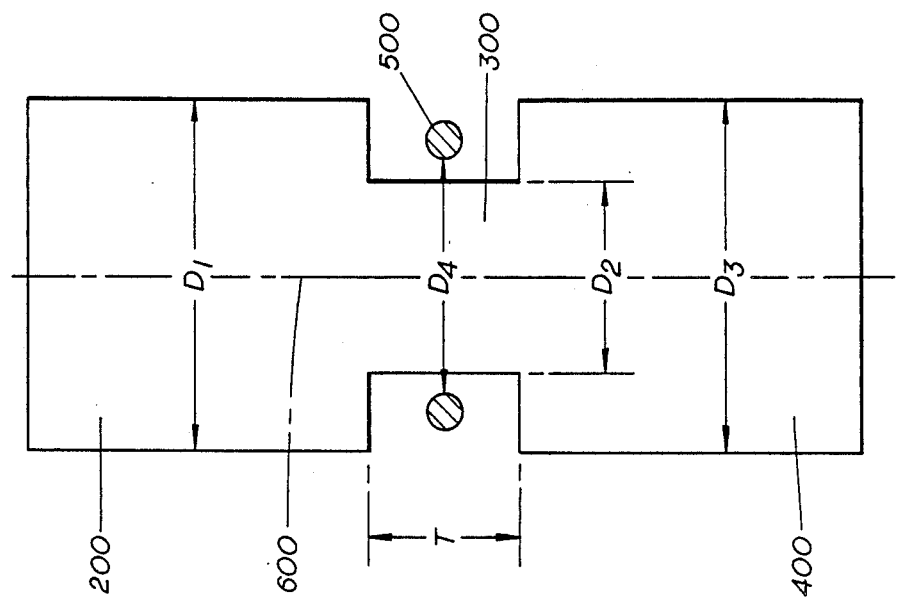
FIG. 21 is a schematic diagram of the geometric involvement of the cutouts used in accordance with the invention.

Referring now to FIG. 21, there is illustrated schematically a section of a logging tool, made in accordance with the present invention, divided into three regions 200, 300 and 400. For the following analysis, the vertical lengths of regions 200 and 400, measured along the longitudinal axis 600, are not important as long as they are considerably longer than the vertical length of region 300. Regions 200 and 400 have a common diameter, D1, although for generality, they are denoted as D1 and D3. Region 300 has a diameter denoted as D2, which is less than D1 and D3. Region 300 has a vertical thickness denoted as T, which in turn defines the length of the cutout. The loop antenna 500 has a diameter denoted as D4, which surrounds the region 300. The antenna 500 is preferably coaxial with the longitudinal axis 600. Although the preferred embodiment contemplates the use of a loop antenna, other types of antennas can also be used.

Generally, optimization of the antenna design of a propagating electromagnetic wave logging tool consists of performing a tradeoff analysis among the parameters D1, D2, D3 (usually set equal to D1), D4 and T. The procedure used heretofore in the art in maximizing this design has been to maximize T and maximize the difference between D4 and D2 consistent with the mechanical constraints imposed on the design of the sensor. This is done in order to assure that the largest possible signal is received by antenna 500; generally, as the difference between D4 and D2 is reduced, or the magnitude of T is reduced, the magnitude of the signal received by 500 is reduced because the conductive body of the tool tends to "short out" (or, more properly, dissipate) the received signal.

However, it turns out that other parameters are important in configuring the response of the sensor. In particular, such a sensor must log through both a borehole and an invaded zone and still provide an accurate measurement of a true formation parameter. The present invention pertains to a method of optimizing the response of a propagating electromagnetic wave sensor for a given borehole (or invaded zone) radius. If the spacing between the source of electromagnetic waves (in the sensor) and the receiver is fixed, there is a limit on how far the sensor can "see" into the formation; as a rule of thumb, this is about twice the transmitter to receiver spacing. This will be referred to hereinafter as "the geometrical limit". The geometrical limit is only achieved when the borehole, invaded zone, and formation offer only a small resistance to the propagation of electromagnetic waves. When the borehole, invaded zone, or formation offer appreciable resistance to the propagation of electromagnetic waves, the geometrical limit will typically not be achieved. In the prior art optimization procedure outlined above, the response falls far short of the geometrical limit. In the method herein disclosed, however, as long as the borehole or invaded zone diameter are less than the geometrical limit, the sensor response can be made to closely approximate that obtainable in the geometric limit.

The method according to the present invention comprises the following steps, the order of steps 4 through 9 being unimportant:

1. Determine the largest borehole diameter which will be encountered in normal service. This should be consistent with the geometric limit mentioned above.

2. Establish a test site such that (a) boreholes can be simulated having a range of resistivities spanning the full range of mud resistivities to be experienced in commercial service.

(b) formation resistivities can be simulated over the range of resistivities to be experienced in commercial service.

3. Fix the diameter of the borehole in the test facility to the diameter determined in step 1.

4. While holding D1, D2, D3, and D4 constant, vary T while examining the response of the sensor over the full range of mud and formation resistivities to be experienced in commercial service.

5. Form a test statistic from the data in step 4 to examine how borehole sensitivity varies with T. For example, if the sensor is designed to measure resistivity, and the actual variable being measured is phase ($\phi$), let $\phi o$ (T,Rb,Rf)=observed phase at thickness T with borehole resistivity Rb and formation resistivity Rf $\phi f$
(Rf)=expected phase from an ideal sensor measuring a formation of resistivity Rf Then a suitable test statistic would be $$S = \frac{|\phi_0 (T, Rb \text{ maximum}, Rf) - \phi_f(Rt)| + |\phi_0 (T, Rb, Rf) - \phi_f(Rf)|}{\phi_f(Rf)}$$

Note that $\phi$ is also a variable of D1, D2, D3, and D4, although this dependence was not written out explicitly in the above equation since these variables were held constant in the above procedure.

Also note that, in this case, it is only necessary to make measurements of S at the minimum and maximum mud resistivities to be experienced in commercial operation (the most extreme borehole effects will always be experienced at one of these values.)

Finally, note that S is constructed to be minimum when borehole effects are minimized. In general, S is a function of T, D1, D2, D3, and D4.

Also note that values of S may be determined analytically, as by finite element methods; there is no a priori reason to resort to experiment, although any good mathematical model should be calibrated against experiments.

6. Fix the variables T, D2, D3, and D4, and vary D1, computing the same statistic as in step 4.

7. Fix the variables T, D1, D3, and D4, and vary D2, computing the same statistic as in step 4.

8. Fix the variables T, D1, D2, and D4, and vary D3, computing the same statistic as in step 4.

9. Fix the variables T, D1, D2, D3, and vary D4, computing the same statistic as in step 4.

10. The procedure given in steps 4 through 9 should be repeated with various values of the "fixed" parameters until enough of the variation in S is defined to locate the absolute minimum in S with respect to the variables T, D1, D2, D3, and D4, consistent with any other constraints imposed by the design (as, e.g., D1 = D3, and D1 determined by tool strength conditions.)

Analytical functions may be constructed at any step in the above procedure, either by recourse to finite element methods and Maxwell's equations, or by multidimensional curve fitting techniques.

11. Locate the absolute minimum of S. In the example we have been following, S(T,D1,D2,D3,D4) is a five dimensional surface. A number of standard techniques are available for locating this minimum. For the purpose of illustration, suppose we are constrained to D1=D3 and we have further noted that S is, for all practical purposes, independent of D4 and D2. Then S = S(T,D1). We thus need only minimize S as a function of two parameters, either by experiment or by theory.

It will often be found that the resulting minimum is far different than what "good" antenna design principles would dictate. In particular, it has been found that:

At 2 Mhz, and when measuring formation resistivity using phase, T can be very small on the order of one or two inches when D1 is on the order of 7 inches.

D2 and D4 can be nearly equal without completely cancelling the received signal. conventional design methodology would separate D2 and D4 as much as is physically possible in order to maximize received signal amplitude. However, this only increases the borehole sensitivity of a sensor.

The above procedure also provides a method for optimizing the protection offered to the antennas of a propagating electromagnetic wave formation evaluation tool since the mechanical constraints can be included in the optimization.

The methods and apparatus described herein contemplate the determination of T(the length of the cutout as illustrated in FIG. 21) based on several factors. However, for use with both 7" and 8" logging tools, our analysis results in optimized performance when using a T length of approximately two inches, with the preferred range of lengths for T being 1-4 inches. The preferred difference between D1 and D2 is approximately 1-¼"; thus, the depth of the cutout is preferably about ⅝". However, the depth of the cutout (D1 D2)/2 should range between ¼" and 1.0".

In designing the length T and the depth of the cutout, it has been found that for mechanical integrity, the length T should preferably not be much shorter than 2" in either a 7" or 8" tool. Likewise for mechanical integrity, the depth should be no deeper than 1", preferably less. For the preferred electromagnetic wave pattern, the depth should be at least 0.25 inches, preferably ⅝ inches, and the length T should be 4" or less, preferably 2".

Figure 22:
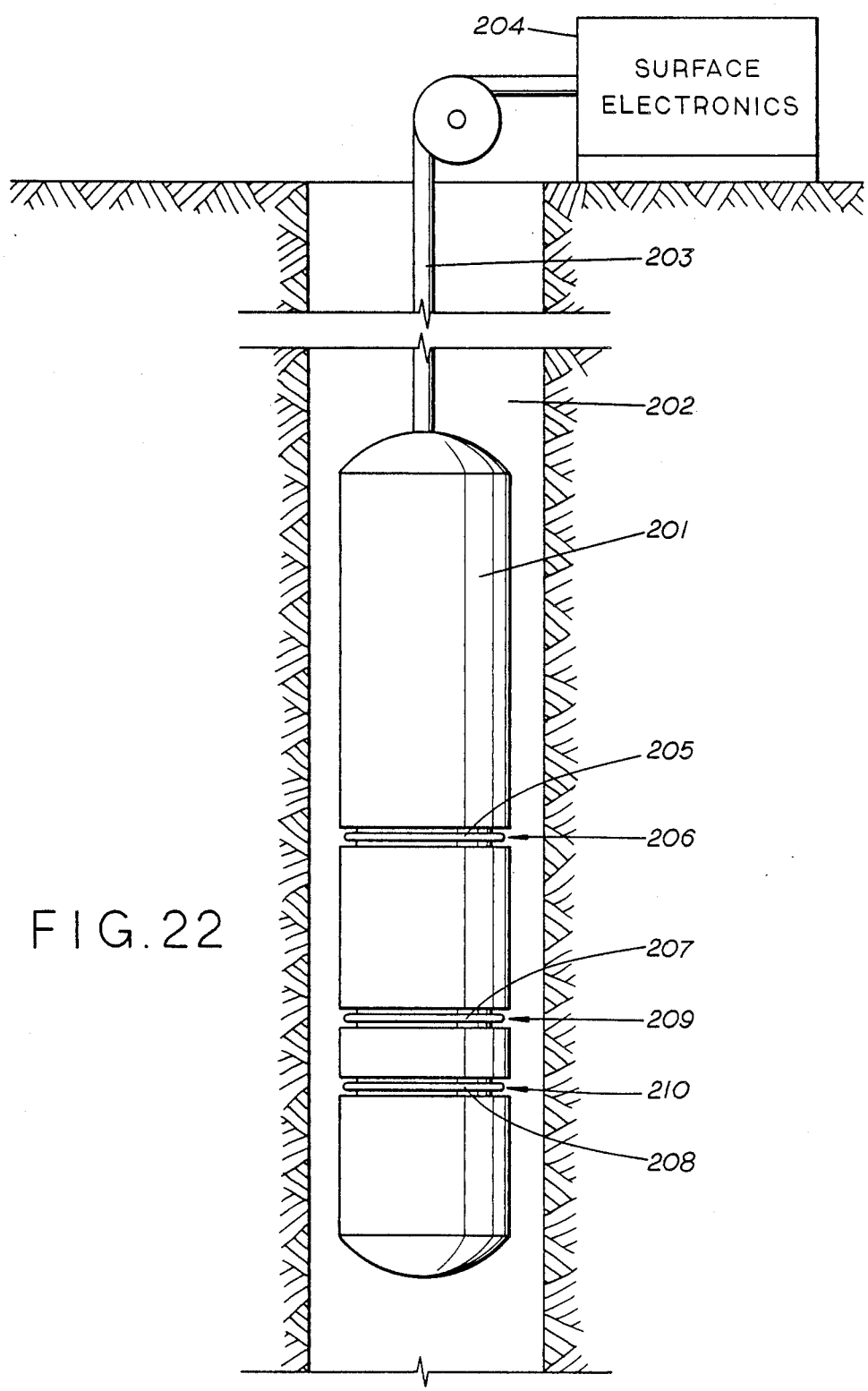
FIG. 22 is an elevated view of a wireline logging tool made in accordance with the invention.

Referring now to FIG. 22, a wireline tool 201 embodying the present invention is illustrated as being suspended in an earth borehole 202 by a logging cable 203 from the earth's surface. The logging cable is connected to the surface electronics 204 in the conventional manner. An electromagnetic wave propagation antenna 205 is located within the cutout section 206. A pair of receiving antennas 207 and 208 are located within the cutout sections 209 and 210 in accordance with the teachings of this invention. If desired, a conventional non-conductive backup shoe (not illustrated) can be used to hold the logging tool 201 against the borehole wall. It should be appreciated that in manufacturing the tool 201, the cutout portions 206, 209 and 210 will be constructed using the same geometrical guidelines as used in constructing the MWD tools, as heretofore discussed.

Figure 23:
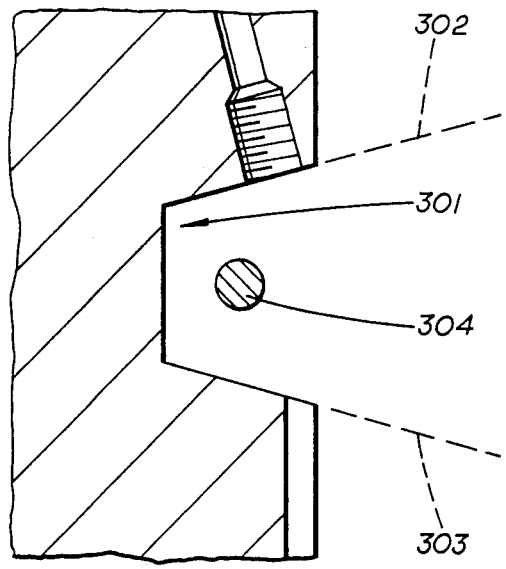
FIG. 23 is an elevated view, partly in cross-section, of a cutout in accordance with the present invention wherein the antenna is placed within a cutout having divergent wall surfaces.

Referring now to FIG. 23, there is illustrated an alternative embodiment of the present invention in which the antenna 304 is placed within a cutout 301 in which the walls of the cutout, as extended by the dotted lines 302 and 303, are divergent to create a slightly different antenna pattern than that illustrated in FIG. 16, for example, in which the walls of the cutout are parallel.

Figure 24:
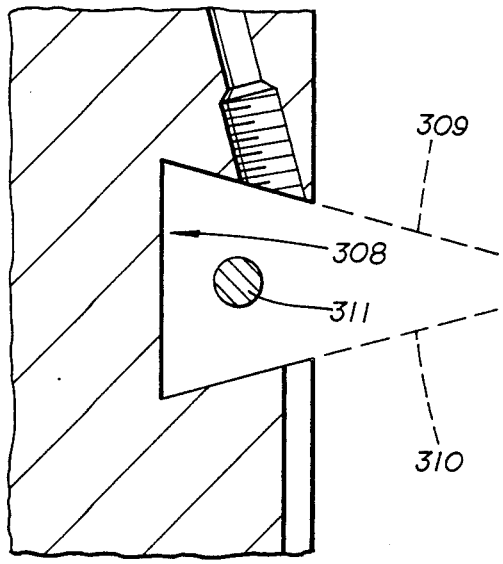
FIG. 24 is an elevated view, partly in cross-section, of a cutout according to the present invention wherein the antenna is placed within a cutout having convergent wall surfaces.

FIG. 24 illustrates yet another embodiment of the present invention in which the antenna 311 is placed within the cutout 308 having convergent walls as shown by the extended dotted lines 309 and 310. Thus, it should be appreciated that the invention can be practiced with cutouts having parallel walls, diverging walls and converging walls, as well as cutouts having stair step walls as illustrated in FIG. 18. Moreover, although the stair steps walls of FIG. 18 are shown as being diverging, those skilled in the art will recognize that the stair step walls of FIG. 18 can also be converging.

What is claimed is:

1. An apparatus for measuring a formation parameter about a borehole traversing an earth formation and containing drilling fluid, comprising:

a tubular, electrically conductive housing means having a longitudinal axis therethrough and threaded at each end for threaded engagement in a drill string above the drill bit and including a passage suitable for conveying drilling fluids therethrough;

means for transmitting electromagnetic energy into the formation surrounding said housing means, said transmitting means disposed about the exterior or said housing means, said transmitting means including a first current loop antenna located in a first cutout of said conductive housing having a length in the range of one to four inches, as measured along said longitudinal axis, said first cutout being annular about the exterior of said tubular housing and being coaxial with said longitudinal axis; and means for receiving electromagnetic energy from said formation, said receiving means including a second current loop antenna located in a second cutout of said conductive housing having a length of one to four inches, as measured along said longitudinal axis, said second cutout being annular about the exterior of said tubular housing and being coaxial with the said longitudinal axis; and a third current loop antenna located in a third cutout of said conductive housing having a length of one to four inches, as measured along said longitudinal axis, said third cutout being annular about the exterior of said tubular housing and being coaxial with said longitudinal axis.

2. The apparatus according to claim 1 wherein each of said first, second and third cutouts has a depth, transverse to the said longitudinal axis, of 0.25 to 1.0 inches.

3. The apparatus according to claim 2 wherein each of said first, second and third cutouts has a length of approximately 2.0 inches and a depth of approximately ⅜ inch.

4. The apparatus according to claim 1 wherein each of said first, second and third cutouts has parallel walls.

5. The apparatus according to claim 1 wherein each of said first, second and third cutouts has a set of diverging walls, each said set of diverging walls being with the exterior surface of said conductive housing.

6. The apparatus according to claim 1 wherein each of said first, second and third cutouts has a set of converging walls, each said set of converging walls being closest spaced apart at the intersection of said set of walls with the exterior surface of said conductive housing.

7. The apparatus according to claim 1 wherein each of said first, second and third cutouts has stairstep walls.

8. The apparatus according to claim 1 wherein at least one of said first, second and third cutouts has parallel walls.

9. The apparatus according to claim 1 wherein at least one of said first, second and third cutouts has a set of diverging walls, each said set of diverging walls being furthermost spaced apart at the intersection of said set of walls with the exterior surface of said conductive housing.

10. The apparatus according to claim 1 wherein at least one of said first, second and third cutouts has a set of converging walls, each said set of converging walls being closet spaced apart at the intersection of said set of walls with the exterior surface of said conductive housing.

11. The apparatus according to claim 1 wherein at least one of said first, second and third cutouts has stair step walls.

12. An apparatus for measuring a formation parameter about a borehole traversing an earth formation and containing drilling fluid, comprising:

a tubular, electrically conductive housing means having a longitudinal axis therethrough and threaded at each end for threaded engagement in a drill string above the drill bit and including a passage suitable for conveying drilling fluids therethrough;

means for transmitting electromagnetic energy into the formation surrounding said housing means, said transmitting means disposed about the exterior of said housing means, said transmitting means including a first current loop antenna located in a first cutout of said conductive housing having a length in the range of one to four inches, as measured along said longitudinal axis, said first cutout being annular about the exterior of said tubular housing and being coaxial with said longitudinal axis; and means for receiving electromagnetic energy from said formation, said receiving means including a second current loop antenna located in a second cutout of said conductive housing having a length of one to four inches, as measured along said longitudinal axis, said second cutout being annular about the exterior of said tubular housing and being coaxial with the said longitudinal axis.

13. The apparatus acording to claim 12 wherein each of said first and second cutouts has a depth, transverse to the said longitudinal axis, of 0.25 to 1.0 inches.

14. The apparatus according to claim 13 wherein each of said first and second cutouts has a length of approximately 2.0 inches and a depth of approximately ⅜ inch.

15. The apparatus according to claim 12 wherein each of said first and second cutouts has parallel walls.

16. The apparatus according to claim 12 wherein each of said first, second and third cutouts has a set of diverging walls, each said set of diverging walls being furthermost spaced apart at the intersection of said set of walls with the exterior surface of said conductive housing.

17. The apparatus according to claim 12 wherein each of said first, second and third cutouts has a set of converging walls, each said set of converging walls being closest spaced apart at the intersection of said set of walls with the exterior surface of said conductive housing.

18. The apparatus according to claim 12 wherein each of said first and second cutouts has stairstep walls.

19. The apparatus according to claim 12 wherein at least one of said first and second cutouts has parallel walls.

20. The apparatus according to claim 12 wherein at least one of said first, second and third cutouts has a set of diverging walls, each said set of diverging walls being furthermost spaced apart at the intersection of said set of walls with the exterior surface of said conductive housing.

21. The apparatus according to claim 12 wherein at least one of said first, second and third cutouts has a set of converging walls, each said set of converging walls being closet spaced apart at the intersection of said set of walls with the exterior surface of said conductive housing.

22. The apparatus according to claim 12 wherein at least one of said first and second cutouts has stair step walls.

23. An apparatus for measuring a formation parameter about a borehole traversing an earth formation and containing drilling fluid, comprising:

a tubular, electrically conductive housing means having a longitudinal axis therethrough and threaded at each end for threaded engagement in a drill string above the drill bit and including a passage suitable for conveying drilling fluids therethrough;

a first cutout in said housing means having a length greater than four inches, as measured along said longitudinal axis;

a second cutout in said housing means, spaced from said first cutout and having a length greater than four inches as measured along said longitudinal axis;

a first metal jacket at least partially covering said first cutout, said first metal jacket having a first cutout and a transmitting antenna located in said first cutout in said first metal jacket; and a second metal jacket at least partially covering said second cutout, said second metal jacket having first and second cutouts and first and second receiving antennas located in said first and second cutouts in said second metal jacket, respectively, said cutouts in said first and second metal jackets each having a length of no greater than four inches, as measured along said longitudinal axis.

24. The apparatus according to claim 23 wherein each of said cutouts in said first and second jackets has a depth, as measured transversely to said longitudinal axis, in the range of 0.25 to 1.0 inches.

25. The apparatus according to claim 24 wherein each of the cutouts in said metal jackets has a length of two inches and a depth of ⅜ inches.

26. An apparatus for measuring a formation parameter about a borehole traversing an earth formation and containing drilling fluid, comprising:

a tubular, electrically conductive housing means having a longitudinal axis therethrough and threaded at each end for threaded engagement in a drill string above the drill bit and including a passage suitable for conveying drilling fluids therethrough;

a first cutout in said housing means having a length greater than four inches, as measured along said longitudinal axis;

a second cutout in said housing means, spaced from said first cutout and having a length greater than four inches as measured along said longitudinal axis;

a first metal jacket at least partially covering said first cutout, said first metal jacket having a first cutout and a transmitting antenna located in said first cutout in said first metal jacket; and a second metal jacket at least partially covering said second cutout, said second metal jacket having first cutout and a receiving antenna located in said first cutout in said second metal jacket, said cutouts in said first and second metal jackets each having a length of no greater than four inches, as measured along said longitudinal axis.

27. The apparatus according to claim 26 wherein each of said cutouts in said first and second jackets have a depth, as measured transversely to said longitudinal axis, in the range of 0.25 to 1.0 inches.

28. The apparatus according to claim 27, wherein each of the cutouts in said metal jackets has a length of two inches and a depth of ⅜ inches.

29. The apparatus according to claim 26 wherein each of said cutouts in said metal jackets has parallel walls.

30. The apparatus according to claim 26 wherein each of said cutouts in said metal jackets has diverging walls.

31. The apparatus according to claim 26 wherein each of said cutouts in said metal jackets has converging walls.

32. The apparatus according to claim 26 wherein each of said cutouts in said metal jackets has stairstep walls.

33. The apparatus according to claim 26 wherein at least one of said cutouts in said metal jackets has parallel walls.

34. The apparatus according to claim 26 wherein at least one of said cutouts in said metal jackets has diverging walls.

35. The apparatus according to claim 26 wherein at least one of said cutouts in said metal jackets has converging walls.

36. The apparatus according to claim 26 wherein at least one of said cutouts in said metal jackets has stair step walls.

37. An apparatus for measuring a formation parameter about a borehhole traversing an earth formation, comprising:

a tubular, electrically conductive housing means having a longitudinal axis therethrough;

means for transmitting electromagnetic energy into the formation surrounding said housing means, said transmitting means disposed about the exterior of said housing means, said transmitting means including a first current loop antenna located in a first cutout of said conductive housing having a length in the range of one to four inches, as measured along said longitudinal axis, said first cutout being annular about the exterior or said tubular housing and being coaxial with said longitudinal axis; and means for receiving electromagnetic energy from said formation, said receiving means including a second current loop antenna located in a second cutout of said conductive housing having a length of one to four inches, as measured along said longitudinal axis, said second cutout being annular about the exterior of said tubular housing and being coaxial with the said longitudinal axis; and a third current loop antenna located in a third cutout of said conductive housing having a length of one to four inches, as measured along said longitudinal axis, said third cutout being annular about the exterior of said tubular housing and being coaxial with said longitudinal axis.

38. An apparatus for measuring a formation parameter about a borehole traversing an earth formation, comprising:

a tubular, electrically conductive housing means having a longitudinal axis therethrough;

means for transmitting electromagnetic energy into the formation surrounding said housing means, said transmitting means disposed about the exterior of said housing means, said transmitting means including a first current loop antenna located in a first cutout of said conductive housing having a length in the range of one to four inches, as measured along said longitudinal axis, said first cutout being annular about the exterior of said tubular housing and being coaxial with said longitudinal axis; and means for receiving electromagnetic energy from said formation, said receiving means including a second current loop antenna located in a second cutout of said conductive housing having a length of one to four inches, as measured along said longitudinal axis, said second cutout being annular about the exterior of said tubular housing and being coaxial with the said longitudinal axis.

* * * * *

UNITED STATES PATENT AND TRADEMARK OFFICE
CERTIFICATE OF CORRECTION

PATENT NO. : 4,940,943
DATED : July 10, 1990
INVENTOR(S) : Roger P. Bartel and Paul F. Rodney It is certified that error appears in the above-identified patent and that said Letters Patent is hereby corrected as shown below:

In Column 10, line 67, delete "or" and insert therefor --of--.

In Column 11, line 32, after "being" insert --furthermost spaced apart at the intersection of said set of walls--.

In Column 13, line 54, delete "have" and insert therefor --has--.

Signed and Sealed this

Thirteenth Day of August, 1991

Attest:

HARRY F. MANBECK, JR.

Attesting Officer

Commissioner of Patents and Trademarks